United States Patent Office 3,091,652
Patented May 28, 1963

3,091,652
PREPARATION OF 9-METHYLENE FLUORENE
Frederick J. Soderquist, Essexville, Harold D. Boyce, Coleman, and James L. Amos, Midland, Mich., assignors to The Dow Chemical Company, Midland, Mich., a corporation of Delaware
No Drawing. Filed Nov. 3, 1960, Ser. No. 66,896
4 Claims. (Cl. 260—668)

This invention relates to a method of producing 9-methylene fluorene. More particularly, it relates to the preparation of this material from 2-ethyl diphenyl by a process of combined dehydrogenation and ring formation.

Dehydrogenation of alkyl derivatives of aromatic hydrocarbons has been widely studied. In general, the dehydrogenation takes place within the alkyl substituent to give the corresponding vinyl derivative of the aromatic hydrocarbon. Thus, the dehydrogenation of ethyl benzene yields styrene, that of isopropyl benzene yields α-methyl styrene. In like manner, β-vinyl naphthalene is derived from β-ethyl naphthalene and 4-vinyl diphenyl from the corresponding 4-ethyl diphenyl.

In view of the known art, the dehydrogenation of 2-ethyl diphenyl should lead to the formation of 2-vinyl diphenyl. Nevertheless, it has now unexpectedly been discovered that in this case reaction is not limited to that occurring solely in the aliphatic substituent. Rather, it has been determined that hydrogen is lost also by the aromatic nucleus with resultant ring closure to give a fluorene structure. Additionally, hydrogen is removed from the ethyl group to give the vinyl substituent. The net effect of the dehydrogenation of 2-ethyl diphenyl has been determined to be the formation of 9-methylene fluorene.

The preparation of 9-methylene fluorene according to the present invention is achieved by the passage of 2-ethyl diphenyl in the vapor state through a reaction zone wherein the vapor comes in contact with a dehydrogenation catalyst under conditions of elevated temperature. Of the catalysts adapted to use in the process of the invention, those that are designated self-reactivating catalysts are generally to be preferred, because of their ability to function for prolonged periods without the necessity of regeneration. These materials generally comprise major quantities of ferric oxide, zinc oxide or magnesium oxide, with minor quantities of chromium and/or copper salts. Additionally, they always include a basic compound such as potassium oxide or potassium carbonate.

While catalysts of the self-reactivating type are generally to be preferred for the reason stated, any of the catalysts generally useful in the dehydrogenation of hydrocarbons may be employed in the preparation of 9-methylene fluorene. These well-known dehydrogenation catalysts include alumina, ferric oxide, chromium oxide, mixtures of ferric and chromium oxides, mixtures of either ferric oxide or chromium oxide or both with potassium oxide, and the like. Other dehydrogenation catalysts will, of course, suggest themselves to those skilled in the art.

In the practice of the invention the 2-ethyl diphenyl is passed as a vapor over a bed of the dehydrogenation catalysts maintained at the normal operating temperature of such catalysts, that is, at a temperature within the range of from about 500° C. to about 850° C. In the case of catalysts of the self-reactivating type, the preferred temperature generally lies within a somewhat narrower range of from about 550° C. to about 750° C.

The vapor of 2-ethyl diphenyl may be passed over the heated dehydrogenation catalyst as a relatively pure vapor or it may be admixed with various amounts of inert diluents such as certain hydrocarbon vapors, nitrogen, carbon dioxide, water vapor or mixtures thereof. Water vapor is, of course, the required diluent when a self-reactivation catalyst is employed.

The dehydrogenation reaction may conveniently be carried out in a tubular, vertical, electrically heated reactor containing the catalyst pellets and fitted with suitable feed, vaporizing and recovery appurtenances. The vaporizing appurtenances should be maintained at a temperature sufficiently high that, if solution of 2-ethyl diphenyl in inert solvent is fed thereto, the total of the solution will vaporize to maintain the desired relative concentrations of reactive vapor and diluent vapor.

The rate of delivery of the feed mixture to the reactor is a matter of choice, being dependent on a variety of factors such as the nature of the particular catalyst, reactor dimensions, composition of the feed, temperature of the reaction zone and the like.

Recovery of product is effected simply by condensing the vaporized product of the dehydrogenation reaction. It will be found that if this is accomplished at a relatively high temperature, as at the temperature of ordinary cooling water, the 9-methylene fluorene will be obtained largely in its polymeric form, together with unreacted 2-ethyl diphenyl, condensed inert hydrocarbon diluent, water and traces of by-product materials. Polymeric 9-methylene fluorene is substantially insoluble in the other products of the reaction and can easily be isolated therefrom. As is known to the art, the polymer is readily thermally degraded to the monomeric product.

If recovery be effected at a relatively low temperature, as at the temperature of Dry Ice, the product will be obtained in the monomeric form in admixture with the other constituents of the vapor exiting from the reactor.

The invention is further illustrated by the following example which is intended to be illustrative only, and wherein all parts and percentages, unless otherwise indicated, are on a weight basis.

*Example 1*

In an iron tube measuring approximately 2.1 cm. in internal diameter and provided with controllable electrical heating means, there were placed 70 cc. of a self-reactivating catalyst in the form of small pellets. The catalyst comprised iron oxide, chromium oxide and potassium oxide as its essential ingredients.

Seventy-five parts of 2-ethyl diphenyl and 225 parts of steam were passed over the catalyst, which was maintained at a temperature of about 625° C., during a period of approximately 3.75 hours. The exiting vapor was condensed in a water cooled receiver. Sixty-six parts of mixed liquid and solid product were obtained, together with aqueous condensate; the aqueous condensate was discarded. The liquid portion, when subjected to infra-red analysis, was found to be a mixture of unreacted 2-ethyl diphenyl, phenanthrene, diphenyl and 9-methyl fluorene the latter being present in only trace amounts.

The solid material, polymeric, 9-methylene fluorene, which amounted to about 15 percent by weight of the product obtained, was separated from the liquid portion. A sample of this solid material was placed in the bottom of a short section of glass tubing closed at one end. The open end of the tubing section was joined to the open end of a similar section, which was packed in Dry Ice, by a short length of rubber tubing.

The section containing the sample was then heated to effect depolymerization of the material. Condensate collected in the cold section. This was immediately dissolved in a cold mixture of carbon disulfide and carbon tetrachloride. Infra-red analysis confirmed the identity of the thermal degradation product as 9-methylene fluorene.

What is claimed is:

1. A method for the preparation of 9-methylene fluorene which comprises the steps of passing vapors of 2-ethyl diphenyl through a zone wherein contact is effected between said vapors and a dehydrogenation catalyst maintained at a temperature of from about 550° C. to about 750° C., recovering the products of the reaction, isolating therefrom the polymeric form of 9-methylene fluorene and thermally converting the said polymeric form of 9-methylene fluorene to 9-methylene fluorene.

2. A method for the preparation of 9-methylene fluorene which comprises the steps of passing vapors of 2-ethyl diphenyl in admixture with an inert gaseous diluent therefor through a zone wherein contact is effected between said vapors and a dehydrogenation catalyst maintained at a temperature of from about 550° C. to about 750° C., recovering the products of the reaction, isolating therefrom the polymeric form of 9-methylene fluorene and thermally converting the said polymeric form of 9-methylene fluorene to 9-methylene fluorene.

3. A method for the preparation of 9-methylene fluorene which comprises the steps of passing vapors of 2-ethyl diphenyl in admixture with an inert gaseous diluent therefor comprising at least water through a zone wherein contact is effected between said vapors and a self-reactivating dehydrogenation catalyst maintained at a temperature of from about 550° C. to about 750° C., recovering the products of the reaction, isolating therefrom the polymeric form of 9-methylene fluorene and thermally converting the said polymeric form of 9-methylene fluorene to 9-methylene fluorene.

4. A method for the preparation of 9-methylene fluorene which comprises the steps of passing vapors of 2-ethyl diphenyl through a zone wherein contact is effected between said vapors and a dehydrogenation catalyst maintained at the operative temperature thereof, and condensing the vapors exiting from said zone to obtain a reaction mixture comprising a material selected from the group consisting of 9-methylene fluorene and polymers thereof.

References Cited in the file of this patent

UNITED STATES PATENTS

| 2,414,118 | Orchin | Jan. 14, 1947 |
| 2,658,089 | Ipatieff et al. | Nov. 3, 1953 |

OTHER REFERENCES

Egloff: Reactions of Pure Hydrocarbons, pp. 481–2, Reinhold Publishing Corp., New York, 1937.

Orchin: Chemical Abstracts, vol. 40, col. 3425 (1946).

Plattner: New Methods of Preparative Organic Chemistry, pp. 47–49, Interscience Publishers, Inc., New York, 1948.

Hansch: Chemical Reviews, vol. 53, No. 3, p. 362, Dec. 1953.